H. J. KIEL.
VALVE OF THE GLOBE TYPE.
APPLICATION FILED JAN. 6, 1908.

940,163.

Patented Nov. 16, 1909.

Witnesses
Gilbert S. Walker
Irwin R. Kiel

Inventor
Henry J. Kiel

UNITED STATES PATENT OFFICE.

HENRY J. KIEL, OF WHEELING, WEST VIRGINIA.

VALVE OF THE GLOBE TYPE.

940,163. Specification of Letters Patent. Patented Nov. 16, 1909.

Application filed January 6, 1908. Serial No. 409,591.

*To all whom it may concern:*

Be it known that I, HENRY J. KIEL, a citizen of the United States, residing at No. 30 Sixteenth street, Wheeling, in the county of Ohio and State of West Virginia, have invented certain new and useful Improvements in Valves of the Globe Type, of which the following is a specification.

Figure 1:
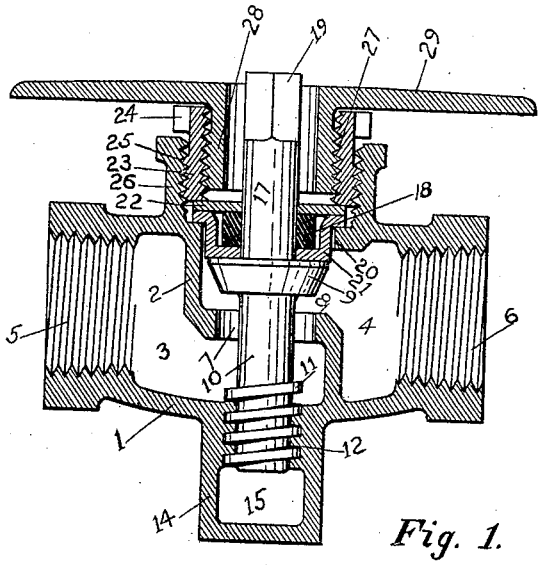
Figure 2:
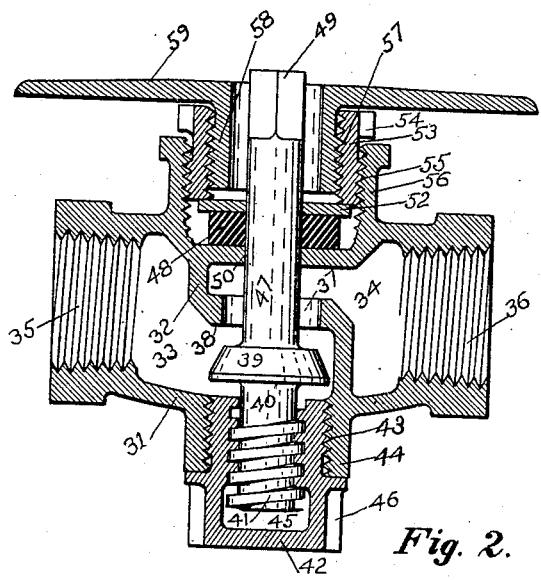

My invention relates to improvements in valves of the globe type, and the object of my improvement is to reduce the height of the upper part of the valve, so that it can be concealed in a floor or partition. I attain these objects by the mechanism illustrated in the accompanying drawing, in which:

Figure 1 is a vertical section of the form which I consider preferable. Fig. 2 is a vertical section of an alternative form or modification.

The preferred form shown in Fig. 1 consists of a casing or valve body 1, divided by a partition 2 into a supply chamber 3 and an outlet chamber 4. The ends 5 and 6 of the body 1 are threaded for pipes communicating with the two chambers 3 and 4. Through the partition 2 is a passage way 7 surrounded by a seat 8. A disk 9 is so disposed that when brought in contact with the seat 8 the passage way 7, will be closed. The disk 9 is attached to a stem 10 and 17, one end 10 of which passes through the passage way 7, and is provided with an operating screw 11, engaging with the threads 12 tapped on the inside of the projection 14 on the lower side of the body 1. There is also a chamber 15 in this projection 14 into which the operating screw 11 can pass. The other end 17 of the stem passes through the packing 18, and its upper end is formed into a square 19 or other form adapted to be engaged by a key not shown. The upper part of the valve body 1 is provided with an opening 20 through which the disk 9 and other parts can be removed, which opening 20 is closed by a recessed lower gland 21. The recess of this gland 21 is filled with packing 18 to prevent leakage, the packing is covered by a washer 22, and forced down by an upper gland 23. The upper gland 23 has lugs 24 or other means for turning it, the outside is threaded to engage with threads 25 tapped on the inside of a collar 26 which projects from the upper side of the body 1. The inside of the upper gland 23 is also tapped with threads 27 engaging similar threads on the outside of a nipple 28 attached to the lower side of a plate 29 which conceals the valve from view.

The alternative form shown in Fig. 2 consists of a casing or valve body 31, divided by a partition 32 into a supply chamber 33 and an outlet chamber 34. The ends 35 and 36 of the body 31 are threaded for pipes communicating with the two chambers 33 and 34. Through the partition 32 is a passage way 37 surrounded by a seat 38. A disk 39 is so disposed that when brought in contact with the seat 38, the passage way 37 will be closed. The disk 39 is attached to a stem 40 and 47, one end 40 of which is provided with an operating screw 41 engaging with threads tapped on the inside of a plug 42. This plug 42 has a small chamber 45 into which the operating screw 41 can pass, and lugs 46 for screwing it in place, and its outside is threaded to engage with similar threads 43 on the inside of a projection 44, on the lower part of the valve body 31. The inside diameter of the threads 43 is large enough to allow the disk 39 to be put in place, or removed when necessary. The other end 47 of the stem passes through the passage way 37, and packing 48 and its upper end is formed into a square 49 or other form adapted to be engaged by a key not shown. The valve body is provided with an opening 50 through which the stem 47 passes. Above this opening 47 is placed packing 48 to prevent leakage, the packing 48 is covered by a washer 52 forced down by a gland 53. The gland 53 has lugs 54 or other means of screwing it down, its outside is threaded to engage with similar threads 55, tapped on the inside of a collar 56 projecting from the top of the body 31. The inside of the gland 53 is also tapped with threads 57 engaging with similar threads on the outside of a nipple 58 attached to the bottom of a plate 59 which conceals the valve from view.

Having described my invention, I claim as new and desire to secure by Letters Patent:

In a valve of the class described, the combination with the casing and apertured partition provided with a valve-seat, of a valve disk adapted to close said aperture, a screw-threaded stem on one side of said disk, whereby the latter is raised and lowered, an operating stem on the other side of said disk, packing through which said last mentioned stem passes, a screw-threaded gland to hold said packing in place, and a cover-plate for the valve having screw-threaded engagement with said gland.

In testimony whereof I affix my signature in presence of two witnesses.

HENRY J. KIEL.

Witnesses:
E. BALZER,
JOHN P. ARBENZ.